United States Patent [19]
Geyer et al.

[11] 3,842,249
[45] Oct. 15, 1974

[54] ELECTRICAL SYSTEM WITH PROGRAMMED COMPUTER CONTROL AND MANUALLY INITIATED CONTROL MEANS

[75] Inventors: Manvel A. Geyer, Lima, Ohio; Frank J. Gordon, Baltimore; Richard C. Lyman, Ellicott City, both of Md.; Larry W. Thaxton, Lima, Ohio

[73] Assignee: Westinghouse Electric Corporation, Pittsburgh, Pa.

[22] Filed: July 24, 1973

[21] Appl. No.: 382,263

Related U.S. Application Data

[63] Continuation of Ser. No. 190,623, Oct. 19, 1971, abandoned.

[52] U.S. Cl.............. 235/151.21, 307/86, 340/163
[51] Int. Cl............................................ G06f 15/56
[58] Field of Search...... 235/151.21; 444/1; 307/52, 307/85, 86; 340/163

[56] References Cited
UNITED STATES PATENTS

| | | | |
|---|---|---|---|
| 3,493,930 | 2/1970 | Stoffels et al. | 340/163 |
| 3,704,380 | 11/1972 | Cohn | 307/52 |

OTHER PUBLICATIONS

Koen et al., Small Digital Computer Controls Large Power System, Electrical World, March 4, 1968, pp. 29–32.

Jurgen, Minicomputer Applications in the Seventies, IEEE Spectrum, Aug. 1970, pp. 37–49.

Geyer et al., Automatic Control of Aircraft Electrical System, Westinghouse Engineer, July 1971, pp. 114–119.

*Primary Examiner*—Felix D. Gruber
*Attorney, Agent, or Firm*—G. H. Telfer

[57] ABSTRACT

An automatically controlled electrical system controls a plurality of loads in the functions of load resetting, logical control, load sequencing, overload evaluation, and load shedding with single point control. A data entry and display means provides a manual interface with the system. The system utilizes remotely controlled power switching and circuit protective devices. A small general purpose computer is used to effect control functions by, preferably, multiplexed control signals. The computer directs the control signals to and from the appropriate switching devices and it also provides capability to program for automatic control, sequencing and self-checkout functions.

6 Claims, 8 Drawing Figures

| 1 2 3 4 5 | 6 | 7 8 9 10 11 12 13 14 15 16 17 18 19 20 21 22 23 24 25 26 27 28 29 30 31 32 33 34 35 36 37 38 39 40 41 42 43 44 45 46 47 |
|---|---|---|
| X | | BOOLEAN EQUATIONS |
| 0 1 2 3 | | CRPC1 = SIMS4 + SKBD1 |
| 2 3 0 1 | | CRPC3 = SIMS20 . SRPC2 + SKBD3 |
| 0 0 1 1 | | CRPC10 = SIMS4 . CRPC10 + SIMS4 . CRPC1A |
| 3 1 1 3 | | CRPC100 = SRPC61 - |
| | | SIML1 = OL1 |
| | | SIML21 = TRPC5 |

FIG. 5

| 1 2 3 4 5 | 6 | 7 8 9 10 11 12 13 14 15 16 17 18 19 20 21 22 23 24 25 26 27 28 29 30 31 32 33 34 35 36 37 38 39 40 41 42 43 44 45 46 47 |
|---|---|---|
| X | | DEFINITION OF THE SYSTEM |
| | | CRPC1  1,8  8  K  0 |
| | | CRPC2  1,7  16  K  1 |
| | | CRPC61  1,15  0 |
| | | DEAD1  1,49 |

FIG. 6

| 1 2 3 4 5 | 6 | 7 8 9 10 11 12 13 14 15 16 17 18 19 20 21 22 23 24 25 26 27 28 29 30 31 32 33 34 35 36 37 38 39 40 41 42 43 44 45 46 47 |
|---|---|---|
| X | | TIME DELAYS |
| | | CRPC1A  CRPC1  9T |
| | | SKBD15 8  SKBD15  10S |

FIG. 7

| 1 2 3 4 5 | 6 | 7 8 9 10 11 12 13 14 15 16 17 18 19 20 21 22 23 24 25 26 27 28 29 30 31 32 33 34 35 36 37 38 39 40 41 42 43 44 45 46 47 |
|---|---|---|
| X | | OVERLOAD EQUATIONS |
| | | OL1 = SIMS1 |
| | | OL2 = SIMS2 . SIMS1 |
| | | OL3 = SIMS2 . SIMS1 + SIMS2 . SIMS3 + SIMS2 . SIMS3 |

FIG. 8

ELECTRICAL SYSTEM WITH PROGRAMMED COMPUTER CONTROL AND MANUALLY INITIATED CONTROL MEANS

This is a continuation, division, of application Ser. No. 190,623 filed Oct. 19, 1971 and now abandoned.

BACKGROUND OF THE INVENTION

1. Field of the Invention:

This invention relates to apparatus for the control and protection of loads of an electrical system.

2. Prior Art:

The general practice in the distribution and management of electrical power in complex electrical systems, such as in aircraft, is individual, manual control of each load by actuation of a switch according to a check list and procedural rules. The switch is commonly a thermal circuit breaker which automatically trips and opens a load circuit in the event of an overcurrent in accord with an overload-time relationship but which requires manual resetting.

Several individual functions can be identified and defined in electrical load management as presently practiced by manual procedures.

"Reset" refers to the operation to restore, or attempt to restore, power to a load circuit after a breaker trips, in the hope the overload condition was temporary. This is accomplished by turning the breaker OFF, waiting a proper cooling time, and turning it ON again.

"Load sequencing" is the function of minimizing transients on the power source and its distribution bus by refraining from simultaneously applying too many large loads. Presently an operator follows a check list with proper waiting periods.

"Load control" identifies the general function of actuating or deactuating loads in accordance with the conditions or states of other loads and switches. "Hard wiring" (built-in circuit paths) is now used with circuit switches, relay contacts, or the like to actuate certain loads following a manual procedure in which other switch positions or indicator lamps are observed.

"Overload evaluation" refers to the recognition of reduced capability of the power source to deliver power because of some reason such as reduced cooling air flow or partial electrical failure. Visual observation of thermometers, ammeters, etc., and/or over-temperature or over-current cutouts are now relied on for this function.

Selective "load shedding" is the function of responding to overload by dropping the least important loads first. It is now accomplished by switching some loads OFF according to a learned or read procedure.

The present practice in load management is limited by the capability of the controlling human agency. When the size and complexity of the system reaches the point at which the optimum speed of response to either ordinary or emergency situations is faster than human reaction time, manual control is desirably replaced by automatic control.

Another disadvantage of present practices is the large amount of panel space required to accommodate the thermal breakers for the loads. In aircraft, this space must be provided in the cockpit. Another major disadvantage is the weight and cost of the wiring running between loads and their breakers.

Remote control of power switching devices has been previously proposed. In the U.S. Navy's Solid State Electrical Logic (SOSTEL) concept mechanical electric-power-switching devices such as thermal circuit breakers, relays and circuit switches are replaced by solid state switching devices and transducers for remote load switching and circuit protection functions.

Various approaches have been proposed for implementing concepts of remote control of electrical loads. In Neill et al, U.S. Pat. No. 3,529,292, titled "Remotely Controlled Load Controlling and Protection System with Supervision," Sept. 15, 1970, is disclosed a system in which the switches for the load are remotely operated and supervised. The pilot or operator is provided a supervisory panel showing the condition of each load and also a control panel permitting manual selection and operation of an individual load. The supervisory and control panels of such a system would provide operator convenience and the remote location of load switches reduces weight and cost of wiring, yet the control or management functions of the system are still performed manually.

A paper by R. C. Eckenfelder entitled "Airborne Display and Electric Management System," WESCON Proceedings, August 1970, paper No. 17/4, also relates to a system with remote circuit breakers and a display means to show their status. A processor is used as an adjunct to the display means to display subsystem operating conditions. Load management functions remain solely manually initiated. This type of system contemplates merely providing warnings or analysis of present or impending faults for the operator's manual correction (i.e., breaker reset, a load shedding, etc.).

A paper by M. S. Osborn et al, titled "Basic Principles of Digital Interior Communication Systems" prepared for SAE 1970 National Air Transportation Meeting, New York, N.Y., Apr. 17, 1970, available from Autonetics, North American Rockwell, Anaheim, California 92803, Paper No. X70- 508/201, is of some interest although directed to communication rather than power systems. The paper indicates an appreciation in the art of aircraft electronics for multiplexed, digital data, from a plurality of points in the system, which "is easily inspected, routed and/or controlled by other digital devices" (p. 20).

A paper by L. D. Dickey et al, IEEE Spectrum, November 1970, pages 73–79, entitled "Solid-state Switching for Aircraft Electric Systems" refers to a system in which supervisory control is provided by a "master control unit" which is programmed only to solve Boolean equations using input data received by multiplexing techniques and which transmits coded output data to selected addresses in the system to effect control functions at remote locations. A further description of such work is contained in a Final Report dated July 1969 by J. L. Jones et al, under contract N00019-68-C-0424 for Naval Air Systems Command, Department of the Navy.

A paper by H. L. Ernst, titled "Solid State Multiplexed Electrical Power Distribution System," presented at the National Air Transportation Meeting, New York, N.Y., Apr. 20–23, 1970, sponsored by the Society of Automotive Engineers, document number 700301, presents a functional discussion of the load management functions that are desirable in an electrical system with some features of automatic control. In this paper (p. 4), it is contemplated to trip and shed loads automatically but to reset loads only manually.

SUMMARY

In a load management system in accordance with this invention a plurality of electrical loads have switching means for the selective application of power from an electrical bus. Data entry and display means is provided for selecting an individual load which has a unique identifier displayed on the display means and for indicating that any load is in a given condition. During the time in which the identifier of any load is so displayed, various routines for load resetting or shedding can be initiated.

Automatic control is provided in the system by a small general purpose computer with data transmission and reception means providing signals to the computer and to the display means indicating the condition of the loads. The invention permits control of complex electrical systems, such as in aircraft, with minimal operator attention and reduced wiring and equipment needs to the cockpit or operator control point yet permits flexibility in operator interaction.

While the invention came about in an effort to provide more effective control for power systems in aircraft and spacecraft, the invention is generally useful in electrical systems in other applications. In those systems where many loads are many feet apart and tens of feet from the control point, such as ships, submarines, or space craft, this invention is especially applicable.

DRAWING

FIGS. 5 to 8 are portions of an exemplary working program presented to facilitate an understanding of a form of the invention.

PREFERRED EMBODIMENTS

Figure 1:
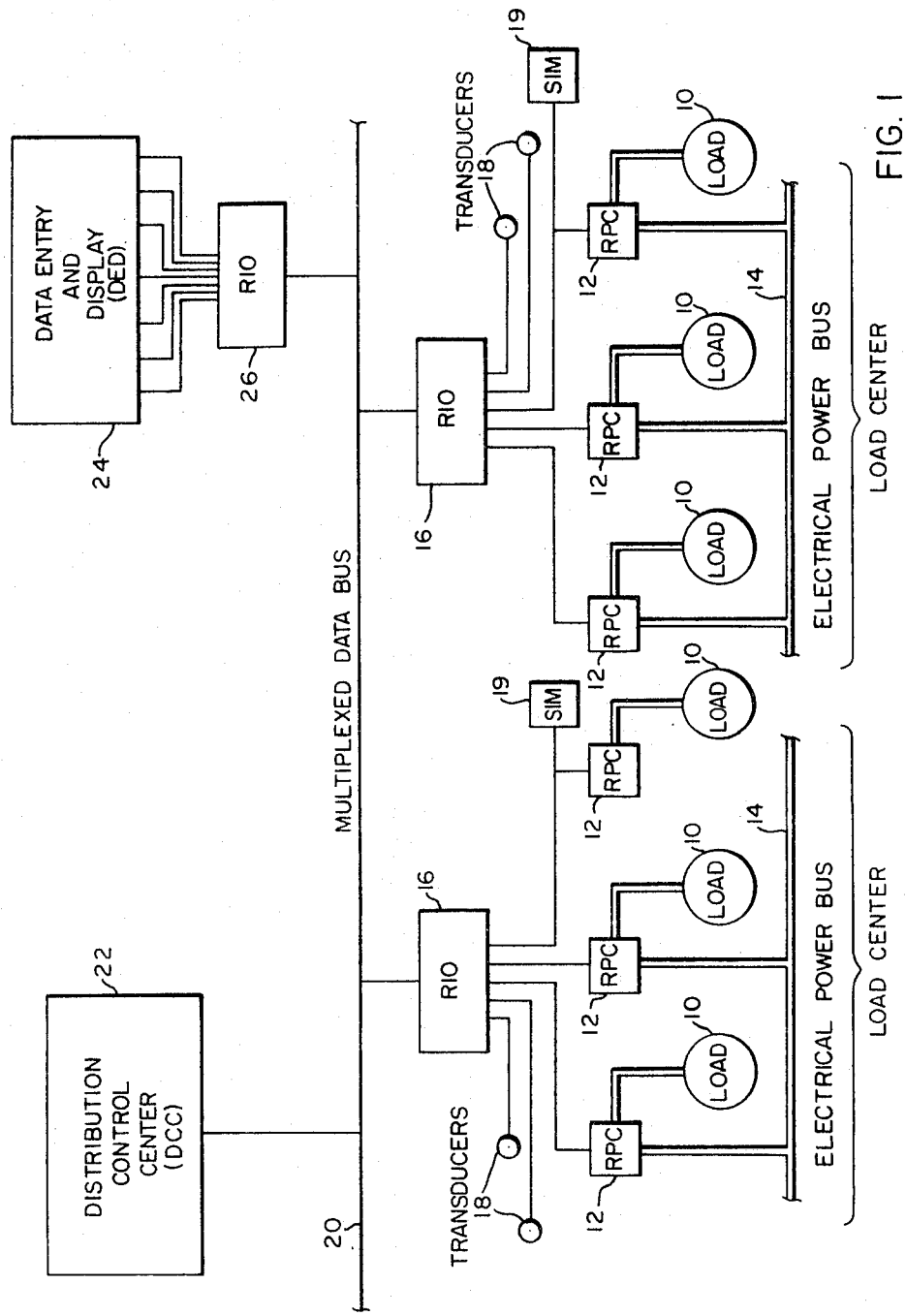
FIG. 1 is a schematic diagram of an automatically controlled electrical system in accordance with the present invention.

Referring to FIG. 1, a general schematic diagram of an electrical system in which the invention may be practiced is shown. Each of a plurality of power consuming loads 10 is connected through a switching means 12 indicated as an RPC (for "Remote Power Controller") to an electrical power bus 14. The RPC comprises a switching circuit preferably of solid state components, that is appropriate to the type of power on the bus (AC or DC). Examples of suitable apparatus for the RPCs is disclosed in copending applications, Ser. No. 092,348, filed Nov. 24, 1970 (now U.S. Pat. No. 3,671,844, issued June 20, 1972), Ser. No. 124,232, filed Mar. 15, 1971 (now U.S. Pat. No. 3,697,860, issued Oct. 10, 1972), and Ser. No. 124,310, filed Mar. 15, 1971 (now U.S. Pat. No. 3,710,231, issued Jan. 9, 1973), by D. E. Baker and assigned to the present assignee; and also in U.S. Pat. No. 3,486,038, issued Dec. 23, 1969, by R. E. Skamfer et al.

A plurality of loads 10 associated with the same bus 14 are electrically grouped in a load center the elements of which are connected to a means 16 (called an RIO for "Remote Input/Output" unit), for sending and receiving multiplexed data signals, which may be in a form as generally known in the multiplexing art. Each RIO has the capability to decode data received by it, such as control signals as will be subsequently explained, and route each signal to the proper RPC. The RIO 16 also produces signals to transmit data indicating RPC status elsewhere on the data bus in the schematic and may also have additional inputs 18 from a number of transducers that supply signals indicating such things as generator temperatures, voltages and currents.

A multiplexed data bus 20 transmits data from and to the load centers and a distribution control center (DCC) 22 and a data entry and display unit (DED) 24 which is associated to the bus 20 through a RIO 26, although in some applications the functions of RIO 26 may be performed by circuitry physically located within DED 24 rather than in a separate unit.

The multiplexed data bus 20 and RIO units 16 and 26 comprise elements of what may be hereinafter referred to as data transmission and reception means.

The distribution control center 22 includes a programmable general purpose digital computer having control, arithmetic, memory, (non-volatile), and input-output units constructed in accordance with known technology. An example of a computer that has been used in the practice of this invention is the Westinghouse Millicomputer described in literature distributed by Westinghouse Electric Corporation, Defense and Space Center, Systems Development Division, Baltimore, Maryland, March 1971. That computer is a military-type computer of modular design using transistor-transistor-logic (TTL) integrated circuit devices of medium scale integration (MSI) complexity.

Figure 2:
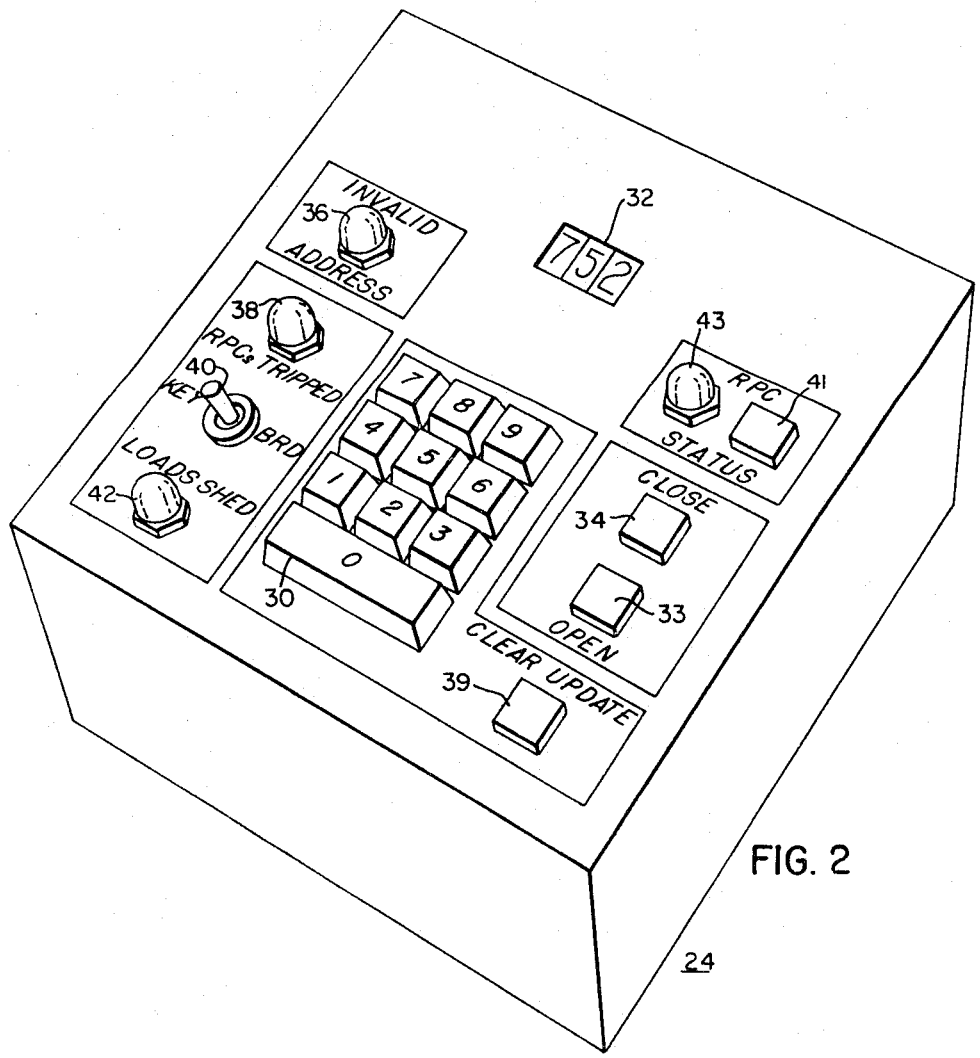
FIG. 2 is a pictorial view of a data entry and display panel in accordance with this invention.

The data entry and display unit 24 (called "DED") is shown in FIG. 2. The DED contains a 10 digit keyboard 30, a numerical display 32 and several switches, preferably operable by push buttons, and indicating lamps or other indicating means. An operator can open or close an RPC by keying in the appropriate RPC address (or "identifier") and pressing the "open" switch 33 or "close" switch 34. The DCC can be programmed if desired to permit keyboard control of only selected RPCs. If an incorrect address or an address of an RPC not subject to keyboard control is keyed in, the "Invalid Address" lamp 36 will light.

If an RPC trips, the "RPCs Tripped" lamp 38 lights. The addresses of the tripped RPCs can be displayed on display means 32 by switching toggle switch 40 to the "RPCs Tripped" mode to display an identifier of a first tripped RPC, and pressing the "clear/update" switch 39 to sequentially display the identifiers of additional tripped RPCs. During the period of time in which the identifier of a load whose RPC is tripped is presented, reclosing may be manually initiated.

If the system goes into an automatic load shedding mode, the "Loads Shed" lamp 42 will light. The identifiers of the RPCs controlling the shed loads can be displayed in a manner similar to that for tripped RPCs by switching to the "Load Shed" mode with toggle switch 40 and control functions may be manually initiated for the identified unit at the time it is presented on the display.

The DED is additionally provided with a switch 41 and an associated lamp 43 for checking the status of any RPC whose appropriate load identifier is put on display 32 by keyboard 30. When Status Switch 41 is closed the indicating lamp will light for a given RPC condition (e.g. "OFF"). Of course, additional indicating lamps may be used to show various RPC conditions.

The lamps of the DED may be of various types including incandescent of neon lamps, light emitting diodes or a segment or dot of a multiple segment or dot matrix display or alpha numeric characters.

In a practical system implemented in accordance with this invention, three separate multiplex data busses 20 (FIG. 1) are used to provide triple redundancy so that at least three failures are necessary to render the system inoperable. Triple redundancy is also provided in each RIO 16. The DCC 22 interrogates the system during operation, checks for a malfunction and chooses a good channel.

In operation, as an example, if an overload condition is sensed by an RPC it provides the circuit protection function by tripping open to prevent damage to the circuit. When it trips open, the RPC transmits an "open" indication signal to the DCC via an RIO and the data bus. After a preprogrammed time delay, the DCC automatically transmits a reset signal to reclose the RPC. If the fault has cleared, the RPC remains closed and power is restored to the load. If the fault persists after a programmed number of automatic reclosures, the DCC transmits a trip indication signal to the cockpit indicating an RPC is tripped. The RPC then remains tripped until manual action is taken to reset. The number of automatic reclosures, which may be typically zero to three, is programmed in the DCC computer for each of the RPCs it controls so the number of automatic reclosures, as well as their time interval, may be varied depending upon load criticality and other criteria.

In addition to man-system interface at the DED, turn-on and turn-off commands can be manually provided, if desired, to the system by switch/indicator modules (SIMs) 19 that have switching and indicating (e.g., lamp) elements located on subsystem control panels. The indicator portion of a SIM is used to indicate if the RPC which the SIM controls has tripped from an overload condition or the indicator may be programmed to indicate other conditions. Manual reset can be accomplished by switching the switch portions of a SIM to "OFF" and then back to the "ON" position. Merely representative SIMs 19 are shown connected with the right-hand RPC 12 in each load center of FIG. 1.

If a portion of the electrical generating capacity of the system is lost, the system will automatically shed loads in accordance with a pre-programmed load priority schedule. This prevents overloading the electrical source.

Various known signal transmission techniques can be employed in the practice of the present invention. A time-division multiplexing technique as opposed to a frequency-division technique was selected for the system. The two extremes of time-division multiplexing are the round-robin method and random-access method. The round-robin method requires that the system be synchronized and that each individual device serviced by the system be assigned a specific time interval in which the transmit and receive. This method is relatively susceptible to electrical noise which might cause spurious data transmission.

The random-access method requires that each load control device have a unique coded address. Each device must be addressed before it can be serviced. The data transmitted by the system to each device usually consists of a single bit, a logical one ("on" signal) or a logical zero ("off" signal). As many as 12 bits, for example, would be required to provide the address code for a device. The 13 bits required to transmit a signal bit of information is extremely wasteful of time and, for servicing of a large number of devices, would drive the bit rate up to an intolerable level from the standpoint of electrical noise susceptibility.

A compromise method called "batch random-access" processing was selected for use in this system. In this method, each RIO instead of each device has a unique address. The devices connected to each RIO are then serviced sequentially as in the round-robin after the RIO has been addressed. This allows devices to be serviced as necessary instead of once every update cycle as with the round-robin method. It also permits up to 64 devices to be serviced with a single address which is much less wasteful of bits. Indeed this method lowers the bit rate to 40,000 bits per second from 500,000 bits per second, which would be required if the fully random-access method were employed. This low bit rate is essential in maintaining the noise immunity necessary in the system.

Figure 4:
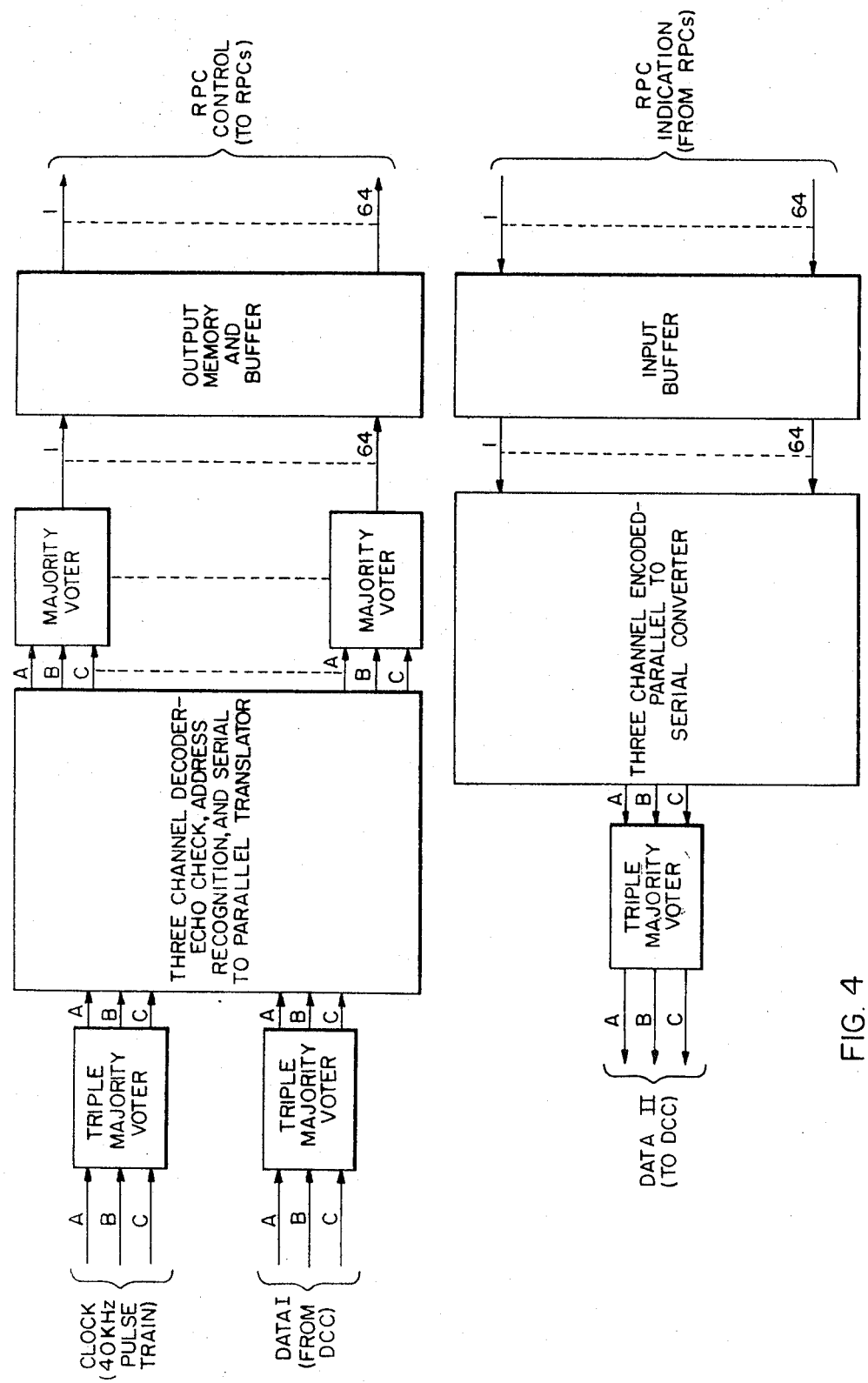
FIG. 4 is a block diagram of an exemplary form of remote input/output unit.

The data bus is preferably a full duplex data bus, that is, there are spearate busses for transmitting and receiving. A first twisted/shielded pair of wires transmits information from the DCC 22 to the RIOs 16. The DCC 22 receives information from the RIOs on a second twisted/shielded pair. A third twisted/shielded pair, transmits a train of pulses (e.g., 40 KHz) which provide the synchronization required by the RIOs 16 to service their connected devices in a round-robin manner. The third pair is not required if signals on the data bus are in Manchester code. FIG. 4 further illustrates an example of an RIO unit and its relation to the DCC and RPCs.

Data transmission reliability is enhanced by transmitting on one of the wires of each twisted/shielded pair the complement of the signal which appears on the other wire. That is, when a positive pulse is transmitted on one, a negative pulse is transmitted on the other. Differential detection of these signals by the DCC 22 and RIOs 16 provides virtual immunity to electrical noise and high common mode voltages which could cause spurious signals on the bus. Further reliability enhancement is provided by using an echo check to make certain that the RIO which will receive the data is the one which was addressed.

The DCC 22 transmits the address code for the RIO 16 connected to the devices to be updated. The RIO which recognizes this coded address responds by transmitting its address code to the DCC (an "echo.") The address code transmitted is compared by the DCC to the one received. If they are the same, the DCC then transmits the updated command data to the RIO and receives the RIO's updated status data. If the two addresses are not the same, the data transmission is aborted. This echo check removes the possibility of spurious addressing.

Three possible modes of data transfer will now be described. All involve the DCC addressing each RIO in turn, as explained above, by the "batch randon access" method. The most obvious mode is transmitting and receiving of all command and status data in a sequential manner, RIO by RIO. In this "total data" mode, a complete system of 30 RIOs can be serviced within 100 milliseconds with presently available technology. In the second possible mode, the DCC sends out new command signals only if one of two events has occurred. First, if previous inputs have caused a command signal to change; second, if a status bit has changed in the RIO. Even if previously inputs have not caused a command signal to change, the DCC transmits a RIO address. If the status of any of the devices on the RIO has not changed, the RIO merely sends its address back. The DCC then transmits the next RIO address. If nothing on the system has changed, the DCC can interrogate a complete system of 30 RIOs within 30 milliseconds with presently available technology. If the status of any device on a RIO has changed, the RIO, during the address echo check, informs the DCC that a status has changed. The DCC then sends out all 64 command signals, getting all 64 status signals back in return. This status information is immediately processed. If any command signals have changed as a result, the proper RIO is addressed and the command signals are transmitted. As soon as all changed command signals are transmitted, the system returns to the interrogate mode. This type of operation avoids the problems, but includes most of the advantages of a priority interrupt system.

The third possible mode of data transfer to a combination of the "total data" and the "change data" modes in that after every ten "change data" mode scans, or some appropriate count, a "total data" mode scan is performed, to protect against any loss of data in the RIOs or any undetected changes in data. This combination of modes adds additional reliability to the system performance. This combination mode is understood to include more complex combination wherein "total data" is transferred to an RIO every ten or so scans after it was last serviced, whether serviced because of a data change or because ten scans had passed without data transfer. The DCC millicomputer can readily be programmed to count data transfers for each RIO and schedule "unrequested" data transfers according to a unique "scan count" for each RIO, dependent upon load response times and reliability requirements.

A system as described in connection with FIG. 1 can be implemented in a variety of specific forms in accordance with known technology.

Figure 3:
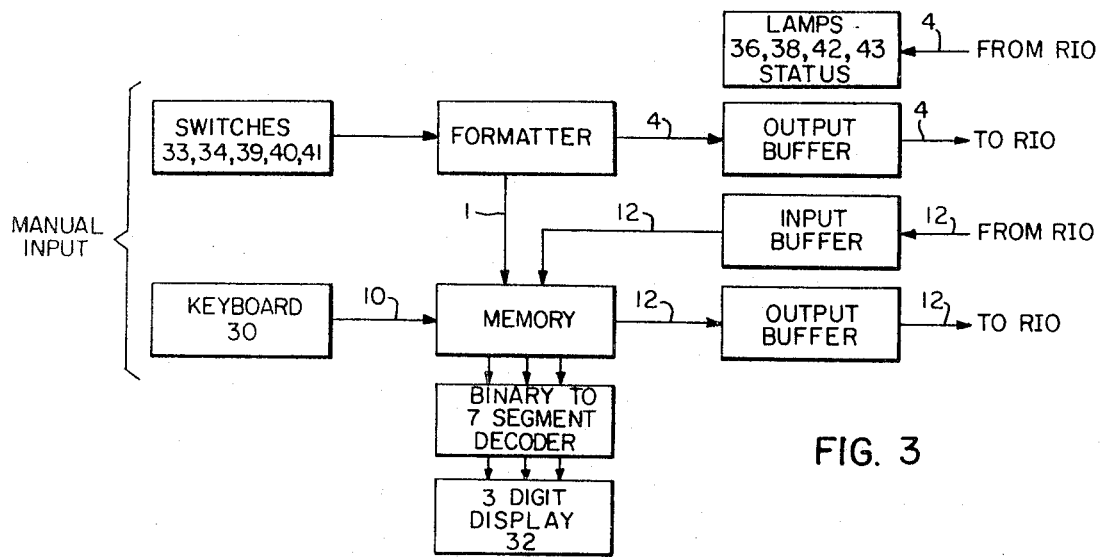
FIG. 3 is a block diagram of an exemplary form of data entry and display panel.

By way of further example, FIG. 3 is presented to show in block diagram form the portions comprising the data entry and display unit 24 in a form that has been made and demonstrated. The elements of FIG. 3 are identified in terms related to the external elements of the DED as shown in FIG. 2 or in terms of their functions as may be implemented in various forms in accordance with known technology. The direction of the arrows connecting the blocks indicates the direction of signal transmission and the numbers associated with the arrows indicates the number of lines or bits transmitted on the signal path in the example apparatus.

FIG. 4 illustrates in block diagram form an example of a Remote Input/Output unit 16 that may be used in systems, in accordance with this invention. This unit utilizes triple redundancy with majority voting which may be implemented by known specific techniques.

The various automatic load management functions can be implemented by programming the Distribution Control Center 22 in accordance with known techniques. The softwave is a key factor for efficient system operation and requires an extensive understanding of the intended system application.

Software for the system falls into several categories. Support software is of a nature that is generally not vital but may be very useful. For example, a program that simulates the distribution control center 22 on a larger digital computer can be important for sizing and designing the memory structure, for analyzing the effects of any word format changes on the timing of the system and for debugging software. The simulation is also useful in analyzing the effects of an operational program change.

Another type of support software that is quite important is a translator. This is a program written for another, larger computer (e.g., IBM 360–50 or Univac 1108) to translate the high-level language of the end-user to the level of the DCC. That is, the translator is the means to develop the operational programs for the system from simple, coded instructions of the end user.

The translator program, called ACESTRAN, incorporates all the desired features which make the system automatic, without encumbering the end-user with the tremendous programming effort. Without any programming effort except for the working program, the translator program generates all load management functions, checklist routines, time delays, self-test, control functions and also performs diagnostics on the working program. In other words, the translator program generates a working program which is stored in the memory of the DCC and this program treats all inputs to the RIOs as input data and all outputs as solutions, as well as inputs.

For example, the first function of the operational program is initialization of the system. All RPCs are set to zero and all switches and sensors are interrogated for status. One input sensor must be bus power. If bus power is off as it should be, the built-in test is performed. This tests each DCC (if more than one), each data bus, each RIO and each RPC by exercising each device and checking for the proper response. Any improper response is analyzed and the malfunctions is indicated on the master data entry and display panel (DED) 24. If bus power is on, the built-in test cannot be run because the RPCs should not be exercised. The RPCs must have a status indication in order to perform built-in test.

Assuming there are no malfunctions, the RPCs which are under the central control of the DED are then turned on or off according to a "start up" schedule set up by the working program. The system is then continuously interrogated for any status changes and the appropriate action taken on any status changes. This procedure is equivalent to the lengthy pre-flight checklist now employed in conventional systems, except this is more thorough and is automatic and requires less time than is necessary to read this sentence. When the bus power comes on, the system turns to a mode of operation which is determined by the mode sensors.

To fully show the simplicity of the user software and the capability of the support software, a working program will now be explained. A listing of a program designed to test all functions is shown in the APPENDIX at the end of this specification.

A portion of that Appendix is listed in FIG. 5 with column numbers used for convenient reference. The portion of FIG. 5 is that which sets forth the Boolean Equations to be solved and is separated from the whole program by an X in Column 1. Note the format of the Boolean equations. The first four column denote the priority in flight Modes 1, 2, 3 and 4 respectively. Thus, if an overload occurs, the DCC evaluates the overload, the mode of flight, determines the priority, chooses the RPCs to be shed and sets the proper command signals to a logical zero. Priority zero loads are never shed; priority one is shed first.

The list of variables is:
CRPC = Command to an RPC
SRPC = Status indication from an RPC
SIMS = Status indication from a SIM
SIML = Command to light a SIM
SKBD = Status of keyboard information
FRPC = RPC reset once
TRPC = RPC reset twice
OL = Overload equation The symbols are:
+ for OR
. for AND (a period)
. − for INVERT (a minus)
= for IF Thus, the first equation of FIG. 5 means that in Mode 1, RPC 1 is never shed; in Mode 2, RPC 1 is Priority 1; in Mode 3, RPC 1 is Priority 2; in Mode 4, RPC 1 is Priority 3; and RPC 1 is to be commanded on IF SIMS4 is on OR if the DED tells it to turn on. The second equation is an example of an AND - OR function. The third equation is an example of a time delay. In this equation, CRPC 1A is a delayed variable. Any alphabetic after the number of a variable indicates a time delay.

In the listing of the Boolean equations, there is no indication of a physical location of any device. The definition of the system is relegated to another section, a portion of which is shown in FIG. 6. This tells the physical location of the devices, indicates for each RPC whether or not it is single point controlled, indicates whether or not it is to be automatically reset and what the time delay is between automatic resets. Referring to FIG. 7, note that CRPC 1 starts in Column 6. The format is:

lect automatic reset, specify time between resets, elect for keyboard control and to establish the on-off state for the checklist function. The translator does the complicated programming necessary for these functions.

Another section, a portion of which is shown in FIG. 7, is the specification of the time delays. The first variable is the delayed variable. The second variable is the variable which must become a one before the timing starts. The next number and alphabetic determine the length of the time delay. For example, CRPC 1A —CRPC 1—9T means that the delayed variable CRPC 1A becomes a logical one 0.9 seconds after variable CRPC 1 becomes a logical one. In the alphabetic time indicator, T means tenths, S means seconds and M means minutes. The maximum time delay is 120 minutes.

Another section is the Overload Equations as shown in FIG. 8. The important note here is that the overloads are Boolean functions and can be sensed from many points. Electrical overloads are not the only overloads that can be considered.

Utilizing the translator program, the time required to write the test program listed in Appendix 1 is only a few hours. Many months would be required to program the same problem without the translator program, called ACESTRAN.

As opposed to systems in which fixed (hardwired) logic control is provided, a programmable system as dislcosed provides advantages of flexibility in that changes in configuration or function can be made inexpensively. Modifications in the relationships between loads, lamps, and switches are easily accomplished by changes in software so it is unnecessary to make expensive changes in wiring and its documentation.

The inputs to the computer of the DCC are primarily of three types, switch, status, and time indications. The switch indications result from mechanical, solid-state, limit, proximity or other types of switches and these indications are single bits of binary information, being in either the ONE or ZERO states. The status indications come from the remote power controllers and represent the state of the controlled loads. They, too, are single bits of binary information, with a ONE representing a load ON and a Zero representing a load OFF. These binary indications come from outside the computer and are regularly stored in the memory of the computer by way of the input/output (I/O) unit of the DCC by

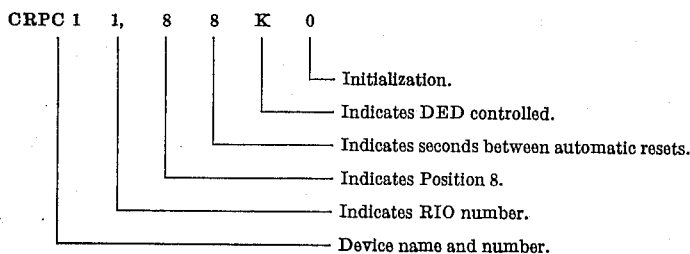

```
CRPC 1   1,   8   8   K   0
                         └── Initialization.
                     └────── Indicates DED controlled.
                 └────────── Indicates seconds between automatic resets.
             └────────────── Indicates Position 8.
         └────────────────── Indicates RIO number.
└────────────────────────── Device name and number.
```

This says RPC Number 1 is located at Position 8 on RIO Number 1. It is automatically reset and has 8 seconds between resets. It is DED controlled and is initially set open at power up (this is the checklist function). CRPC 61—1, 15—0 says RPC Number 61 is located at Position 15 on RIO Number 1. It is not automatically reset and is not DED controlled. DEAD 1—1, 49 indicates the DED is connected on RIO Number 1 at Positions 49 through 64. Note how simple it is to seknown computer technology. The time indications are multiple bit binary representations of time and are provided internal to the DCC by an I/O unit.

The outputs from the computer are primarily load or display command signals. These are single bits of binary information, with a ONE representing a command to turn a load or display lamp ON and a ZERO representing a command for a load or lamp to be OFF. These commands are stored in the computer memory by the operational programs. They are read from memory and transmitted to the RPCs and display indicators by any of several means including the RIO units in accordance with known technology.

The load management functions are to be performed by the following methodology that is implemented by operational software routines in the DCC.

"Reset" of loads is performed in a method that recognizes the trip of any RPC by disagreement between command and status bits. Automatic timeout or time delay for a predetermined wire cooling delay period is initiated. When the delay is over, the command is cycled OFF then ON and thus the load is reset. A subsequent trip can be recognized in the same way and a subsequent reset executed for a number of times programmed. At some selected number of trips, say three, additional automatic resets can be locked out until the load is manually turned OFF. In the case of certain loads it may be desired to prevent any automatic resetting.

Logical control of loads is effected by having the operation desired for each load expressed in a Boolean algebraic equation. Each equation is stored in the computer in a canonical AND-OR form in a unique manner. The result of evaluating each equation is stored as the command bit for each load. An individually assigned time delay may be allowed to elapse after a reference input goes to ONE before a delayed input goes to ONE.

Load sequencing functions are provided to prevent unwanted transients on the power busses. The Boolean equation representing any load can be written to include delayed representations of other load commands such that a single input can accomplish the initiation of many loads but the loads will turn ON in sequence with desired delays between, rather than turn ON simultaneously.

Overload evaluation is accomplished by having inputs representing overload conditions among the inputs stored in the computer memory. Any overload situation, however complex, is represented by a Boolean algebraic equation in canonical AND-OR form and is handled just as the load equations are handled. A multiplicity of overload equations can be used to represent any level of emergency. Delayed inputs are generally used in overload equations to preclude system responses to short, transient overloads.

Load shedding is effected by having an assigned priority for each mode of system operation stored in the computer memory. When an overload situation occurs, a schedule of automatically shedding (turning OFF) of low priority loads is followed. By this means, operation of critical loads is allowed to continue without manual response. Manual intervention is still permitted to restore shed loads or turn other loads OFF.

The Data Entry and Display panel is a means for single point manual control in conjunction with the automatic control provided by the DCC. The software permits command of any appropriate load and also rejects inappropriate or non-existent load addresses with an "invalid address" display. The occurrence of any trip of an RPC or shedding of loads is signalled by "Trip" and "Shed" display lamps. Importantly, there is also provided a sequential display of the addresses of all tripped or shed loads on request. When any address is displayed manual reset operations can be initiated. Additionally the manual entering of an RPC's address results in display of its status and permits manual alteration of its status. Thus it is seen a wide range of variety and complexity of single point control is provided by the present system beyond that provided by any system of the prior art.

Implementation of the DCC memory preferably is by use of single-bit memory words to store command and status information for each RIO whereas the other parts of the operational programs use more conventional 16-bit memory words. This choice is made practical by semiconductor memory wherein one-bit word lengths are as economical per bit as 16-bit word lengths, in contrast to core or plated wire magnetic memory. This method permits easy addressing of related command, status, trip, and single-point control bits by simple incremental relations between their word addresses.

APPENDIX-EXAMPLE WORKING PROGRAM

```
X ASSIGNMENT DEFINITIONS:
    CRPC1 1,8 8 K 0 ---------------------------------------------- ACES0020
    CRPC2 1,7 16 K 1 --------------------------------------------- ACES0030
    CRPC3 1,9 0 K 0 ---------------------------------------------- ACES0040
    CRPC4 1,6 32 K 1 --------------------------------------------- ACES0050
    CRPC5 1,10 8 K 1 --------------------------------------------- ACES0060
    CRPC6 1,5 0 K 0 ---------------------------------------------- ACES0070
    CRPC7 1,11 24 K 1 -------------------------------------------- ACES0080
    CRPC8 1,4 0 K 0 ---------------------------------------------- ACES0090
    CRPC15 1,12 0 K 0 -------------------------------------------- ACES0100
    CRPC100 1,3 0 K 1 -------------------------------------------- ACES0110
    CRPC20 1,13 8 K 0 -------------------------------------------- ACES0120
    CRPC31 1,2 8 K 1 --------------------------------------------- ACES0130
    CRPC45 1,14 8 ------------------------------------------------ ACES0140
    CRPC52 1,1 0 ------------------------------------------------- ACES0150
    CRPC61 1,15 0 ------------------------------------------------ ACES0160
    CRPC10 1,16 16 ----------------------------------------------- ACES0170
    DED1 1,49 ---------------------------------------------------- ACES0180
    SPON1 1,17 --------------------------------------------------- ACES0190
    MODE1 1,18 --------------------------------------------------- ACES0200
    MODE2 1,19 --------------------------------------------------- ACES0210
    MODE3 1,20 --------------------------------------------------- ACES0220
    MODE4 1,21 --------------------------------------------------- ACES0230
    SDES1 1,22 --------------------------------------------------- ACES0240
    SDBS1 1,23 --------------------------------------------------- ACES0250
    SDKS1 1,24 --------------------------------------------------- ACES0260
C SPON1 IS TURNED ON TO INDICATE THAT THE POWER SYSTEM VOLTAGE IS UP ---- ACES0270
C ONLY ONE MODE SWITCH SHOULD BE ON AT ANY ONE TIME ------------------- ACES0280
C SDES1 IS TURNED ON TO ENBALE ERROR LOCKUP OF THE DCC ---------------- ACES0290
C SDBS1 IS TURNED ON TO ENABLE BIT ------------------------------------ ACES0300
C SDKS1 IS TURNED ON TO ENABLE THE CHECKLIST INITIALIZATION OF THE ---- ACES0310
C KEYBOARD CONTROLLED RPCS -------------------------------------------- ACES0320
    SIMS1 1,25 --------------------------------------------------- ACES0330
    SIMS2 1,26 --------------------------------------------------- ACES0340
    SIMS3 1,27 --------------------------------------------------- ACES0350
    SIMS4 1,28 --------------------------------------------------- ACES0360
```

Table —Continued

```
         SIMS10 1,29-------------------------------------------------- ACES0370
         SIMS20 1,30-------------------------------------------------- ACES0380
         SIMS21 1,31-------------------------------------------------- ACES0390
         SIMS15 1,32-------------------------------------------------- ACES0400
         SIML5 1,17--------------------------------------------------- ACES0410
         SIML6 1,18--------------------------------------------------- ACES0420
         SIML7 1,19--------------------------------------------------- ACES0430
         SIML8 1,20--------------------------------------------------- ACES0440
         SIML9 1,21--------------------------------------------------- ACES0450
         SIML11 1,22-------------------------------------------------- ACES0460
         SIML12 1,23-------------------------------------------------- ACES0470
         SIML13 1,24-------------------------------------------------- ACES0480
         SIML1 1,25--------------------------------------------------- ACES0490
         SIML2 1,26--------------------------------------------------- ACES0500
         SIML3 1,27--------------------------------------------------- ACES0510
         SIML4 1,28--------------------------------------------------- ACES0520
         SIML10 1,29-------------------------------------------------- ACES0530
         SIML15 1,32-------------------------------------------------- ACES0540
         SIML20 1,30-------------------------------------------------- ACES0550
         SIML21 1,31-------------------------------------------------- ACES0560
       X TIME DELAYS------------------------------------------------- ACES0570
         CRPC1A CRPC1 9T---------------------------------------------- ACES0580
         SKBD15B SKBD15 10S------------------------------------------- ACES0590
         SRPC4D SRPC4 1M---------------------------------------------- ACES0600
       X OVERLOAD EQUATIONS------------------------------------------ ACES0610
         OL1=SIMS1---------------------------------------------------- ACES0620
         OL2=SIMS2.SIMS1---------------------------------------------- ACES0630
         OL3=SIMS2.SIMS1+SIMS2.SIMS3+SIMS1.SIMS2.SIMS3---------------- ACES0640
       X BOOLEAN EQUATIONS------------------------------------------- ACES0650
  0123   CRPC1=SIMS4+SKBD1-------------------------------------------- ACES0660
  1230   CRPC2=SIMS10+SKBD2------------------------------------------- ACES0670
  2301   CRPC3=SIMS20.SRPC2+SKBD3------------------------------------- ACES0680
  3012   CRPC4=SIMS20.SRPC1+SKBD4------------------------------------- ACES0690
  0321   CRPC5=SIMS21.TRPC1-+SKBD5------------------------------------ ACES0700
  0231   CRPC6=SIMS15+SKBD6+SKBD6------------------------------------- ACES0710
  0132   CRPC7=SIMS15.SKBD7+SKBD7------------------------------------- ACES0720
  0000   CRPC8=SIMSI+SKBD8+SKBD8-------------------------------------- ACES0730
         DUMMY=SIMS4.CRPC10------------------------------------------- ACES0740
  0011   CRPC10=SIMS4.CRPC1A+DUMMY------------------------------------ ACES0745
  1111   CRPC15=SKBD15----------------------------------------------- ACES0750
  2222   CRPC20=SKBD15B.SKBD20--------------------------------------- ACES0760
  3333   CRPC31=SKBD31---------------------------------------------- ACES0770
  0101   CRPC45=SRPC15.SRPC20.SRPC31-—------------------------------- ACES0780
  1010   CRPC52=SRPC1.SIMS20---------------------------------------- ACES0790
  2020   CRPC61=SRPC4D---------------------------------------------- ACES0800
  3113   CRPC100=SRPC61-—------------------------------------------- ACES0810
         SIML5=SPON1------------------------------------------------ ACES0820
         SIML6=MODE1------------------------------------------------ ACES0830
         SIML7=MODE2------------------------------------------------ ACES0840
         SIML8=MODE3------------------------------------------------ ACES0850
         SIML9=MODE4------------------------------------------------ ACES0860
         SIML11=SDES1----------------------------------------------- ACES0870
         SIML12=SDBS1----------------------------------------------- ACES0880
         SIML13=SDKS1----------------------------------------------- ACES0890
         SIML1=OL1-------------------------------------------------- ACES0900
         SIML2=OL2-------------------------------------------------- ACES0910
         SIML3=OL3-------------------------------------------------- ACES0920
         SIML4=TRPC1+TRPC10----------------------------------------- ACES0930
         SIML10=TRPC2----------------------------------------------- ACES0940
         SIML15=TRPC6+TRPC7----------------------------------------- ACES0950
         SIML20=TRPC3+TRPC4+TRPC52---------------------------------- ACES0960
         SIML21=TRPC5----------------------------------------------- ACES0970
         END
```

We claim:

1. A load management system, for a plurality of electrical loads including switching means associated with each load for the selective application of power from an electrical bus, comprising: data entry and display means having selection means for selecting an individual load and display means for displaying an identifier of a selected load, first indicator means responsive to the condition of a switching means to indicate upon request whether the switching means associated with the selected load is open or closed, means to change the switching means associated with the selected load from one state to the other, second indicator means to indicate whether any of said switching means are tripped, and third indicator means to indicate whether any of said loads are shed; a distribution control center comprising a programmable digital computer including a program operative to control load functions, said functions including switching means resetting, load sequencing and load shedding according to programmed priorities and time delays; data transmission and reception means associated with said switching means, said data entry and display means, and said distribution control center for producing, transmitting, and receiving signals representing conditions of said switching means, signal representing requests made at said data entry and display means, and control signals from said computer.

2. The subject matter of claim 1 wherein: said data entry and display means selection means comprises a manually operable digitized keyboard for selecting an identifier of a load, said first indicator means responsive to the condition of a switching means comprises a first lamp and a first manual switch whereby said lamp lights only when said manual switch is closed and said switching means of a selected load is in a given open or closed state, said means to change said switching means of a selected load from one state to the other comprises second and third manual switches to initiate closing or opening, respectively, of said switching means of a selected load, said second indicator means to indicate whether any of said switching means are tipped comprises a second lamp and a fourth manual switch whereby said lamp lights when any of said switching means are tripped and when said manual switch is closed the identifier of a first said loads whose associated switching means is tripped is automatically presented on said display means without use of said keyboard, said data entry and display means also comprising a memory interrelated with said display means to cause said display means to present in sequence the identifiers of each of said loads whose associated switching means is tripped when said fourth manual switch is closed and an additional manual switch is closed, said third indicator means to indicate whether any of said loads are shed comprises a third lamp and a fifth manual switch whereby said lamp lights when at least one of said loads is shed and, when said manual switch is closed the identifier of a first of said shed loads is automatically presented on said display means without use of said keyboard, said memory also being arranged to cause said display means to present in sequence the identifiers of each of said shed loads when said fifth manual switch and said additional manual switch are closed.

3. The subject matter of claim 2 wherein: said fourth and fifth manual switches of said second and third indicator means comprise a single switch device having an open position in which a load identifier may be presented on said display means by manual operation of said keyboard, a first closed position for indicating automatically said tripped switching means, and a second closed position for indicating automatically said shed loads.

4. The subject matter of claim 1 wherein: said data transmission and reception means employs time division multiplexing with batch random access processing.

5. In an electrical system including a plurality of loads and associated power controllers for each of the loads for application of power from an electrical power bus where said loads and power controllers are remotely located with respect to a manual operator location, an automatic/manual control system comprising: a data transmission and reception means for communicating data in the form of electrical signals between the remotely located power controllers and a data entry and display unit at said operator location, between said power controllers and a computer programmed for controlling said power controllers, and between said computer and said data entry and display unit; said computer being programmed for functions including the automatic resetting of tripped power controllers, the automatic sequencing of loads to be connected to the power bus, and the automatic shedding of loads in accordance with predetermined conditions on said electrical power bus, said functions being performed with programmed priorities and time delays; said data entry and display unit including means for manually initiating control functions of said power controllers and for monitoring the status of said power controllers.

6. The subject matter of claim 5 wherein: said data transmission and reception means employs time division multiplexing with batch random access processing; said data entry and display unit comprises selection means for selecting an individual load and display means for displaying an identifier of a selected load, first indicator means responsive to the condition of a power controller to indicate upon request whether the power controller associated with a selected load is open or closed, means to change the power controller associated with the selected load from one state to the other, second indicator means to indicate whether any of said power controllers are tripped, and third indicator means to indicate whether any of said loads are shed; each of said power controllers comprising a solid state switching device.

* * * * *